United States Patent
Sakita

(10) Patent No.: US 9,252,666 B2
(45) Date of Patent: Feb. 2, 2016

(54) CHARGING DEVICE

(71) Applicant: TDK Corporation, Minato-ku, Tokyo (JP)

(72) Inventor: Kouichi Sakita, Minato (JP)

(73) Assignee: TDK Corporation (JP)

( * ) Notice: Subject to any disclaimer, the term of this patent is extended or adjusted under 35 U.S.C. 154(b) by 235 days.

(21) Appl. No.: 14/167,179

(22) Filed: Jan. 29, 2014

(65) Prior Publication Data

US 2014/0210402 A1 Jul. 31, 2014

(30) Foreign Application Priority Data

Jan. 30, 2013 (JP) .................................. 2013-015295
Feb. 20, 2013 (JP) .................................. 2013-030613

(51) Int. Cl.
*H02J 7/00* (2006.01)
*H02M 3/158* (2006.01)
*H02J 7/02* (2006.01)

(52) U.S. Cl.
CPC ............. *H02M 3/1584* (2013.01); *H02J 7/022* (2013.01)

(58) Field of Classification Search
USPC .......................... 320/107, 109, 116, 118, 136
See application file for complete search history.

(56) References Cited

U.S. PATENT DOCUMENTS

| 2011/0025271 A1* | 2/2011 | Yamamoto | B60L 11/1864 320/118 |
| 2011/0291616 A1* | 12/2011 | Kim | B60L 3/003 320/109 |
| 2013/0049457 A1* | 2/2013 | Komatsu | H02J 7/0014 307/9.1 |
| 2013/0113437 A1* | 5/2013 | Ishibashi | H02J 7/00 320/136 |

FOREIGN PATENT DOCUMENTS

JP 2000-166114 A 6/2000

* cited by examiner

*Primary Examiner* — Brian Ngo
(74) *Attorney, Agent, or Firm* — Harness, Dickey & Pierce, P.L.C.

(57) ABSTRACT

A charging device is configured with a power supply device and a DC-DC converter that have constant current voltage drooping type overcurrent protection characteristics and that are connected in series. A constant current value in a voltage drooping state of the DC-DC converter is lower than a constant current value in a voltage drooping state of the power supply device. The DC-DC converter is shifted to an operation state to supply a charging current of the constant current value to a charging target when a voltage value of a direct current voltage that is output from the power supply device reaches a maximum output voltage value or an approximate value thereof. Therefore, the charging target can be charged to a higher voltage even though a charging voltage of the charging target is low.

7 Claims, 5 Drawing Sheets

CHARGING DEVICE

CROSS-REFERENCE TO RELATED APPLICATION

This application claims priority to Japanese Patent Application Nos. 2013-015295 filed Jan. 30, 2013, and 2013-030613 filed Feb. 20, 2013 which are hereby expressly incorporated by reference herein in their entirety.

BACKGROUND

The present invention relates to a charging device that is configured by serially connecting a DC-DC converter to a power supply device that outputs a direct current (DC) voltage. Further, the present invention relates to a charging device that is configured by serially connecting a plurality of power supply devices that output a DC voltage.

As disclosed in Japanese Patent Publication No. 2000-166114, a charging device that is configured by connecting a plurality of power supply devices in series has been known. Specifically, this charging device has a configuration in which a plurality of DC power supply devices having the same specifications are provided. Further, output terminals of a required number of the DC power supply devices are connected in series. As a result, a required high voltage can be obtained by adding each output DC voltage that is output from each of the serially connected DC power supply devices. In this charging device, each DC power supply device starts the operation at the same time and performs the charging for a battery pack that is composed with a plurality of secondary batteries. Further, in this charging device, a constant-current charging is performed for the battery pack while a charging current that flows in the battery pack and a charging voltage of the battery pack are detected. Then, when the detected charging voltage reaches a charge completion voltage that is defined in advance, the charging device stops the charging operation. Therefore, according to this charging device, a mass production effect of the DC power supply device can be pursued, and as a result, a low cost configuration of the device can be realized.

Further, according to the charging device explained above, the DC voltage is not generated from the DC power supply device over an entire generatable voltage range (for instance, 0-90 volts). The DC voltage is generated within a relatively narrow voltage range (for instance, 60-90 volts) because the use of a low voltage range that significantly lowers the power supply efficiency is to be avoided. As a result, the power supply efficiency of each DC power supply device can be increased.

The charging device described above, however, still has some problems to be solved. Specifically, the charging device explained above adopts the configuration in which a voltage range of the DC voltage that is generated by each DC power supply device is limited to the narrow range as explained above so as to increase the power supply efficiency. As a result, a battery for which a charging voltage is lower than the above limited narrow voltage range cannot be charged.

SUMMARY

The present invention attempts to solve the problems explained above. An object of the present invention is to provide a charging device that can also charge a rechargeable device (a storage device, a battery pack, a secondary battery) to a high voltage by connecting a plurality of power supply devices in series and that can charge the rechargeable device for which a charging voltage is low while the deterioration of the power supply efficiency is decreased.

A charging device according to one aspect of the present invention includes: a power supply device that has a constant current voltage drooping type overcurrent protection characteristic, that includes a first positive output terminal and a first negative output terminal, and that output a first direct current voltage between the first positive output terminal and the first negative output terminal; and a DC-DC converter that is connected to the power supply device in series, that has the constant current voltage drooping type overcurrent protection characteristic, that includes a positive input terminal, a negative input terminal, a second positive output terminal and a second negative output terminal, and that output a second direct current voltage between the second positive output terminal and the second negative output terminal. The first positive output terminal is connected to the positive input terminal and the first negative output terminal is connected to the negative input terminal. The DC-DC converter outputs the second direct current voltage by receiving the first direct current voltage as an operation voltage. Further, the power supply device is connected to the DC-DC converter in series by connecting the first positive output terminal to the second negative output terminal. A charging target is connectable between the first negative output terminal and the second positive output terminal. The power supply device has a first constant current value when the power supply device is in a voltage drooping state. Similarly, the DC-DC converter has a second constant current value when the DC-DC converter is in the voltage drooping state. Here, the second constant current value is lower than the first constant current value. Thus, the DC-DC converter is shifted to an operation state to supply a charging current of the second constant current value to the charging target when a voltage value of the first direct current voltage reaches one of a maximum output voltage value and an approximate value thereof.

In the charging device according to the aspect of the present invention, when the DC voltage of the power supply device is lower than the threshold voltage and when a charging voltage of the charging target is low, the charging target is charged by the DC voltage (the charging voltage of the charging target) supplied from only the power supply device until the DC voltage reaches the threshold voltage. After the DC voltage reaches the threshold voltage, the charging target can be charged by both of the power supply device and the DC-DC converter to a higher charging voltage (a sum of the maximum output voltage values of the power supply device and the DC-DC converter). Therefore, while the power supply efficiency of the entire charging device can be maintained sufficiently high, charging targets that require low or high charging voltages can be charged. Note that the charging target may be a rechargeable device (a storage device, a battery pack, a secondary battery), hereinafter a battery or a storage battery.

A charging device according to another aspect of the present invention includes: a plurality of power supply devices that are connected in series, each of the plurality of power supply devices having a positive output terminal and a negative output terminal; a power source control device that sequentially shifts the plurality of power supply devices to an operation state in a predetermined order; and a rectifying device that is connected between the positive output terminal and the negative output terminal of each of the plurality of power supply devices except one of the plurality of power supply devices that is initially shifted to the operation state, and a forward direction of the rectifying device faces toward the positive outlet terminal. The positive output terminal of one of the plurality of power supply devices located at a low potential side is connected to the negative output terminal of one of the plurality of power supply devices located at a high potential side so as to serially connect the plurality of power supply devices. Further, a battery is connected between the positive output terminal of one of the plurality of power supply devices located at a highest potential side and the negative output terminal of one of the plurality of power supply devices located at a lowest potential side.

In the charging device according to the aspect of the present invention, the power source control device compares a charging voltage of the battery with a predetermined threshold voltage. The power source control device shifts next power supply device to the operation state in the predetermined order when the charging voltage reaches the threshold voltage. Further, the threshold voltage is a total maximum output voltage value that is obtained by adding each maximum output voltage value of each of the plurality of power supply devices that are shifted to the operation state. Alternatively, the threshold voltage is an approximate value of a total maximum output voltage value that is obtained by adding each maximum output voltage value of each of the plurality of power supply devices that are shifted to the operation state.

Further, in the charging device according to the aspect of the present invention, the power source control device sequentially shifts the plurality of power supply devices to the operation state in an order of descending maximum output current values.

According to a charging device of the present invention, the "n" power supply devices that are connected in series can sequentially be shifted to an operating state in a predetermined order. Therefore, a battery of which a charging voltage is low can also be charged. Further, when a charging voltage in which the power supply efficiency decreases is low, the charging device explained above can minimize the number of the power supply devices that performs the charging operation to be 1. When the charging voltage reaches a threshold voltage, i.e., when the charging voltage becomes high to some extent, a next power supply device can be shifted to an operating state. Therefore, the plurality of power supply devices can charge the battery for a higher charging voltage. At the same time, the occurrence of a state, in which power supply efficiency is low and in which the plurality of power supply devices operate at the same time, can be avoided. As a result, deterioration of the power supply efficiency of an entire charging device can be decreased.

Further, in the charging device according to the aspect of the present invention, a power supply control device compares the charging voltage with a threshold voltage. Specifically, the threshold voltage is defined in advance to be either a sum of voltage values (a total voltage value) of maximum output voltage values of the power supply devices, which are in the operating state, or a neighboring voltage value of the total (maximum) voltage value. In this case, the total maximum voltage value corresponds to the number of the power supply devices that is in the operating state. Further, when the charging voltage reaches the threshold voltage, a next power supply device is shifted to the operation state. As a result, the voltage value of the DC voltage of each power supply device can be as high as possible when this new power supply device (the next power supply device) is shifted to the operating state. Therefore, the occurrence of a state, in which power supply efficiency is low and in which each of the power supply device operates at the same time, can certainly be avoided. The deterioration of power supply efficiency of the entire charging device can more certainly decrease.

Further, in the charging device according to the aspect of the present invention, because the power supply devices perform the operation in a descending order from the maximum output current value that is defined by an overcurrent protection characteristic, a constant-current charging can be performed with a large current value when the charging voltage of the battery is low. As a result, the battery can be charged in a short period of time while decreasing the deterioration of the power supply efficiency of the entire charging device.

DESCRIPTION OF EXEMPLARY EMBODIMENTS

First Embodiment

A charging device CH according to a first embodiment of the present invention will be explained below with reference to the drawings.

Figure 1:
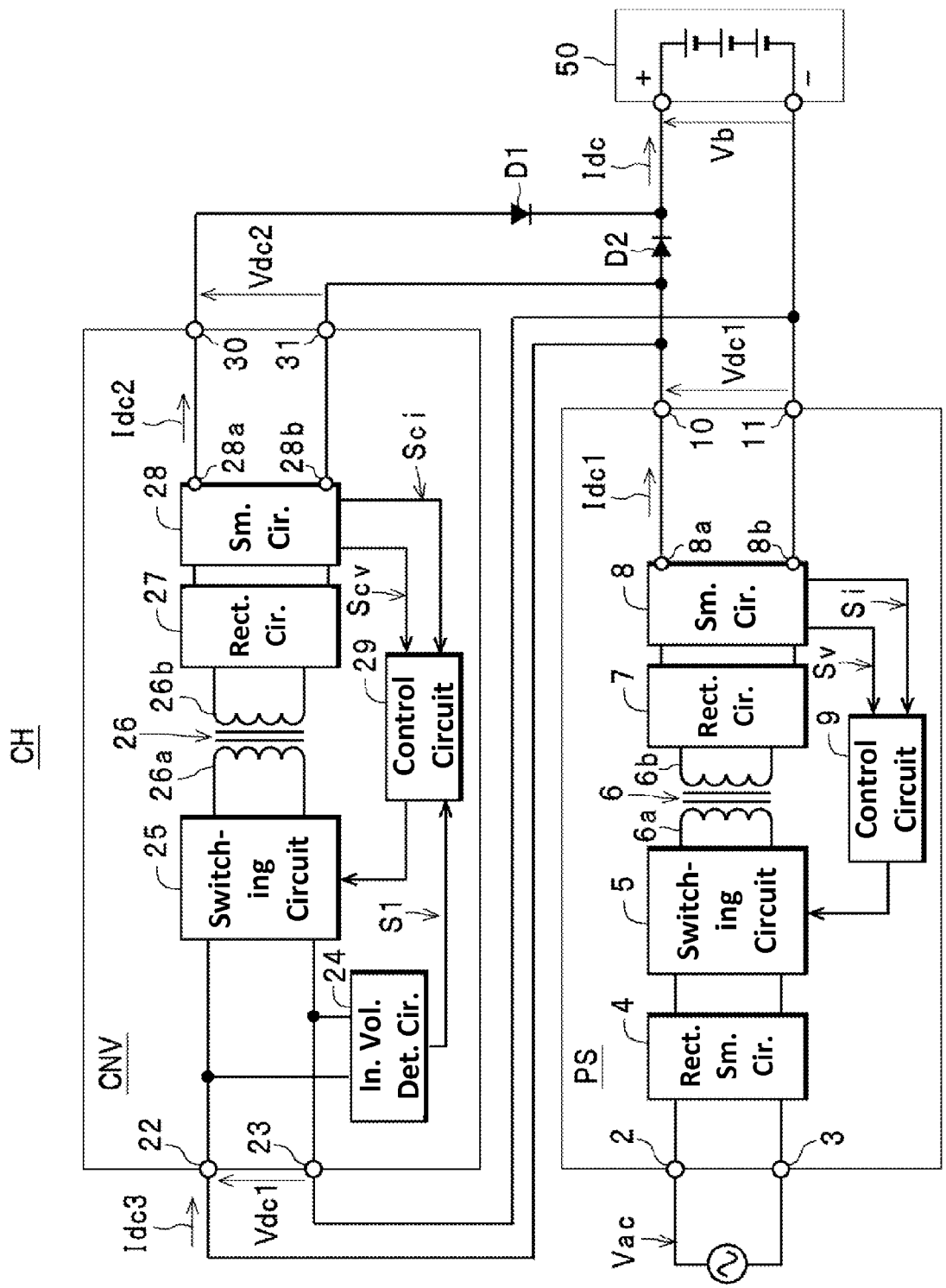
FIG. 1 is a circuit diagram that shows a configuration of a charging device CH that has a power supply device PS and a DC-DC converter CNV according to an embodiment of the present invention.

First, a configuration of the charging device CH shown in FIG. 1 is explained. The charging device CH is configured with a single power supply device PS, a single DC-DC converter CNV that is an example of another power supply device, a reverse flow prevention rectifying device D1 and a bypass rectifying device D2. Further, the charging device CH outputs a direct current (DC) voltage to a storage battery unit 50 as a battery (a charging target) to be charged and charges the storage battery unit 50 to a predetermined charging voltage value. Specifically, the DC voltage corresponds to a DC voltage Vdc1 or a DC voltage (Vdc1+Vdc2) that will be explained below. The charging voltage value corresponds to a sum of voltage values (a total voltage value) of each of reference voltage values Vref1 and Vref2). Further, the storage battery unit 50 is, as an example, configured by connecting a plurality of storage batteries in series.

The power supply device PS is configured with a positive input terminal 2, a negative input terminal 3, a rectification smoothing circuit 4, a switching circuit 5, a transformer 6, a rectifying device 7, a smoothing circuit 8, a control circuit 9, a positive output terminal 10 and a negative output terminal 11. The power supply device PS is configured as an insulated converter in which an input voltage that is input between the positive input terminal 2 and the negative input terminal 3 is converted into a direct current (DC) voltage Vdc as an output voltage. Specifically, although the input voltage explained above corresponds to an alternate current (AC) voltage Vac in the first embodiment according to the present invention, the input voltage can be a DC voltage.

Figure 2:
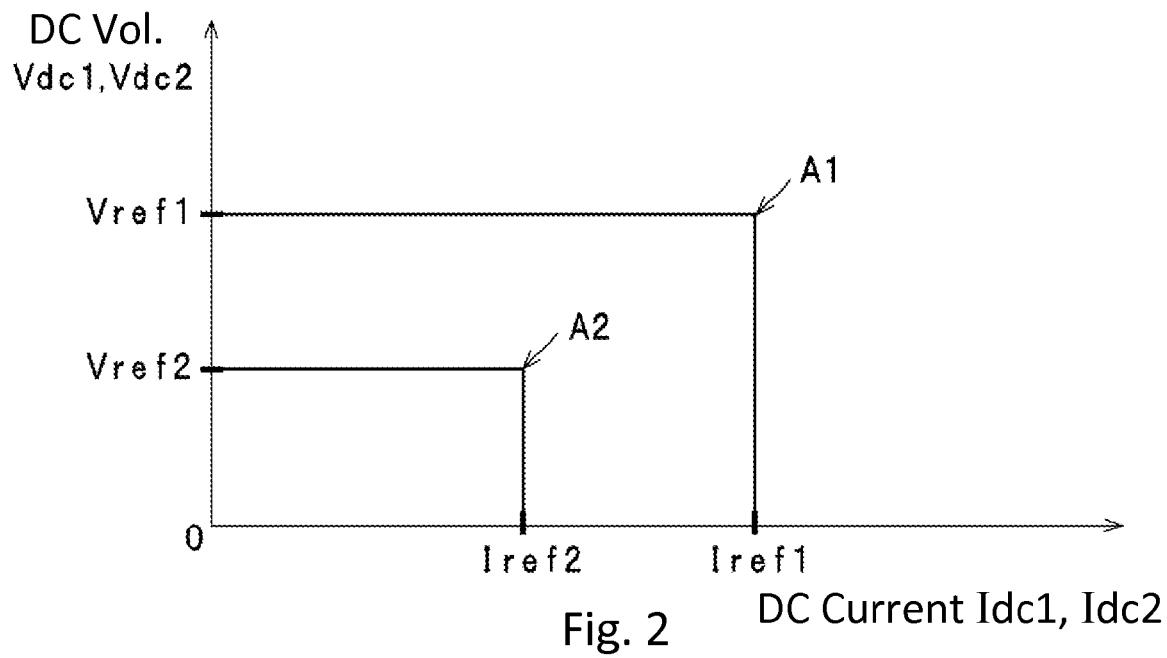
FIG. 2 is an output characteristic diagram that shows an output characteristic A1 of a DC voltage Vdc1 and a DC current Idc1 of a power supply device PS and an output characteristic A2 of a DC voltage Vdc2 and a DC current Idc2 of a DC-DC converter CNV according to an embodiment of the present invention.

Further, as shown in an output characteristic diagram A1 in FIG. 2, the power supply device PS has a constant current voltage drooping type overcurrent protection characteristic, in which a voltage value of a DC voltage Vdc1 is limited by a reference voltage value Vref1 and a current value of a DC current Idc1 is also limited by a reference current value Iref1. Specifically, the voltage value of the DC voltage Vdc1 is also referred to as a "voltage value Vdc1" in the embodiment. The current value of the DC current Idc1 is also referred to as a "current value Idc1" in the embodiment. Further, the power supply device PS can be configured with various insulated converters such as forward, flyback, bridge and push-pull converters as long as it is an insulated converter.

A rectification smoothing circuit 4 converts an AC voltage Vac to a DC voltage by rectifying and smoothing the AC voltage Vac and outputs the DC voltage. When a DC voltage is input instead of the AC voltage Vac, a smoothing circuit can be used instead of the rectification smoothing circuit 4. Further, when the number of ripples of the DC voltage that is input is small, the rectification smoothing circuit 4 can be omitted.

The switching circuit 5 has a switching element (such as a transistor; not shown). The switching element is controlled by the control circuit 9 so as to repeat ON and OFF operations. As a result, the switching circuit 5 performs a switching operation for the DC voltage (i.e., an input voltage in the switching circuit 5) that is output from the rectification smoothing circuit 4 and intermittently applies the DC voltage to the transformer 6. The transformer 6 has, as an example, a primary winding 6a and a secondary winding 6b that are electrically isolated from each other. Further, because the DC voltage is intermittently applied to the primary winding 6a by the switching circuit 5, the transformer 6 induces an AC voltage at the secondary winding 6b.

The rectifying circuit 7 converts the AC voltage that is induced at the secondary winding 6b into a pulsating voltage by rectifying and outputs the pulsating voltage. The smoothing circuit 8 configures a rectification smoothing circuit together with the rectifying circuit 7. The smoothing circuit 8 converts the pulsating voltage that is rectified by the rectifying circuit 7 into a DC voltage Vdc1 by smoothing. Then, the DC voltage Vdc1 is output between a positive output end 8a and a negative output end 8b. Further, the smoothing circuit 8 has a voltage detection unit (not shown) and a current detection unit (not shown). The voltage detection unit is, for instance, configured with a voltage dividing resistance circuit and detects the DC voltage Vdc1. At the same time, the voltage detection unit generates a voltage detection signal Sv and outputs it to the control circuit 9. Specifically, a voltage value of the voltage detection signal Sv changes according to a voltage value of the DC voltage Vdc1. Further, the current detection unit is configured with a detection resistor of which a minute resistance value is, for instance, less than 1Ω. Further, the current detection unit detects a direct current (DC) current Idc1 that is output from the positive output end 8a and the negative output end 8b. At the same time, the current detection unit generates a current detection signal Si and outputs it to the control circuit 9. Specifically, a voltage value of the current detection signal Si changes according to a current value Idc1 of the DC current Idc1.

The control circuit 9 performs switching control for a switching element of the switching circuit 5. In this switching control, the control circuit 9 calculates a voltage value Vdc1 of the present DC voltage Vdc1 based on the voltage detection signal Sv and calculates a current value Idc1 of the present DC current Idc1 based on the current detection signal Si. Further, the control circuit 9 controls the switching element of the switching circuit 5 so as to make the DC voltage Vdc1 and the DC current Idc1 satisfy with the output characteristic diagram A1 shown in FIG. 2 (current-voltage characteristics), i.e., so as to have a constant current voltage drooping type overcurrent protection characteristic based on the voltage value Vdc1 of the present DC voltage Vdc1 and the current value Idc1 of the present DC current Idc1 that are calculated.

Specifically, the control circuit 9 performs a duty ratio control (or a frequency control) for the switching element of the switching circuit 5. When the current value Idc1 of the DC current Idc1 that is output is less than the reference current value (a maximum output current value) Iref1, the control circuit 9 performs a constant voltage control operation in which the voltage value of the DC voltage Vdc1 is controlled to be a predetermined reference voltage value (the maximum output current value) Vref1 and is outputs. In a state in which the current value Idc1 of the DC current Idc1 reaches the reference current value Iref1, the control circuit 9 performs the constant voltage control operation by which the voltage value Vdc1 of the DC voltage Vdc1 is charged while the current value Idc1 of the DC voltage Vdc1 is maintained (limited) to be the predetermined reference current value Iref1.

The DC-DC converter CNV is configured with a positive input terminal 22, a negative input terminal 23, an input voltage detection circuit 24, a switching circuit 25, a transformer 26, a rectifying circuit 27, a smoothing circuit 28, a control circuit 29, a positive output terminal 30 and a negative output terminal 31. The DC-DC converter CNV operates by receiving an external input voltage (the DC voltage Vdc1 that is output from the power supply device PS in the embodiment) that is input between the positive input terminal 22 and the negative input terminal 23 an operation voltage. Specifically, the positive input terminal 22 is connected to the positive output terminal 10 of the power supply device PS via a connecting line. The negative input terminal 23 is connected to the negative output terminal 11 of the power supply device PS via the connecting line. The DC-DC converter CNV is configured as an insulated type DC-DC converter that converts the DC voltage Vdc1 into a DC voltage Vdc2 and outputs the DC voltage Vdc2.

Further, as shown in an output characteristic diagram A2 in FIG. 2, the DC-DC converter CNV has a constant current voltage drooping type overcurrent protection characteristic, in which a voltage value of the DC voltage Vdc2 is limited by the reference voltage value Vref2 and a current value of the DC current Idc2 is limited by the reference current value Iref2 (Iref2<Iref1). Specifically, the voltage value of the DC voltage Vdc2 is also referred to as a "voltage value Vdc2" in the embodiment. The current value of the DC current Idc2 is also referred to as a "current value Idc2" in the embodiment. Further, the DC-DC converter CNV can be configured with various insulated converters such as forward, flyback, bridge and push-pull converters as long as it is an insulated converter.

In this case, the reference current value Iref2 is defined to be lower than the reference current value Iref1 explained above. However, the reference voltage value Vref2 can be defined to be a lower than the reference voltage value Vref1 explained above as shown in FIG. 2. However, the reference voltage value Vref2 can also be defined to be equal to or more than the reference voltage value Vref1 unlike the state shown in FIG. 2.

However, in the charging device CH explained above, the power supply device PS supplies all power for charging the storage battery unit 50 including power that is supplied to the DC-DC converter CNV. Therefore, a maximum value of power (a maximum power value) that is supplied to the storage battery unit 50 by the charging device CH for charging the storage battery unit 50 is smaller than a maximum value of power (a maximum power value) that can be output from the power supply device PS.

In this case, as discussed below, in a state in which the power supply device PS maintains the voltage value Vdc1 of the DC voltage Vdc1 to be the reference voltage value Vref1 (a constant voltage operating state), the maximum power value of the charging device CH as explained above corresponds to a power value ((Vref1+Vref2)×Iref2) explained next. This power value is defined as follow: a power value at a time of being shifted from a constant current operating state to a constant voltage operating state in the DC-DC converter CNV. Specifically, the constant current operating state corresponds to a state in which the DC-DC converter CNV charges the storage battery unit 50 by limiting the current value Idc2 of the DC current Idc2 to the reference current value Iref2. The constant voltage operating state corresponds to a state in which the DC-DC converter CNV charges the storage battery unit 50 by limiting the voltage value Vdc2 of the DC voltage Vdc2 to the reference voltage value Vref2. Therefore, in the charging device CH explained above, the reference voltage value Vref2 and the reference current value Iref2 are defined in advance so as to make the power value ((Vref1+Vref2)× Iref2) of the charging device CH to be less than the maximum power value (Vref1×Iref1) of the power supply device PS.

The input voltage detection circuit 24 is, for instance, configured with a voltage dividing resistance circuit (not shown), a reference power source and a comparator. The voltage dividing resistance circuit divides an external input voltage (the DC voltage Vdc1 in the embodiment) that is input between the positive input terminal 22 and the negative input terminal 23. The comparator compares the divided voltage explained above with a reference voltage that is output from the reference power source (for instance, a Zener diode). As a result, the input voltage detection circuit 24 outputs an operation signal Si when the voltage value Vdc1 of the DC voltage Vdc1 is equal to or more than a predetermined threshold voltage Vth.

Figure 3:
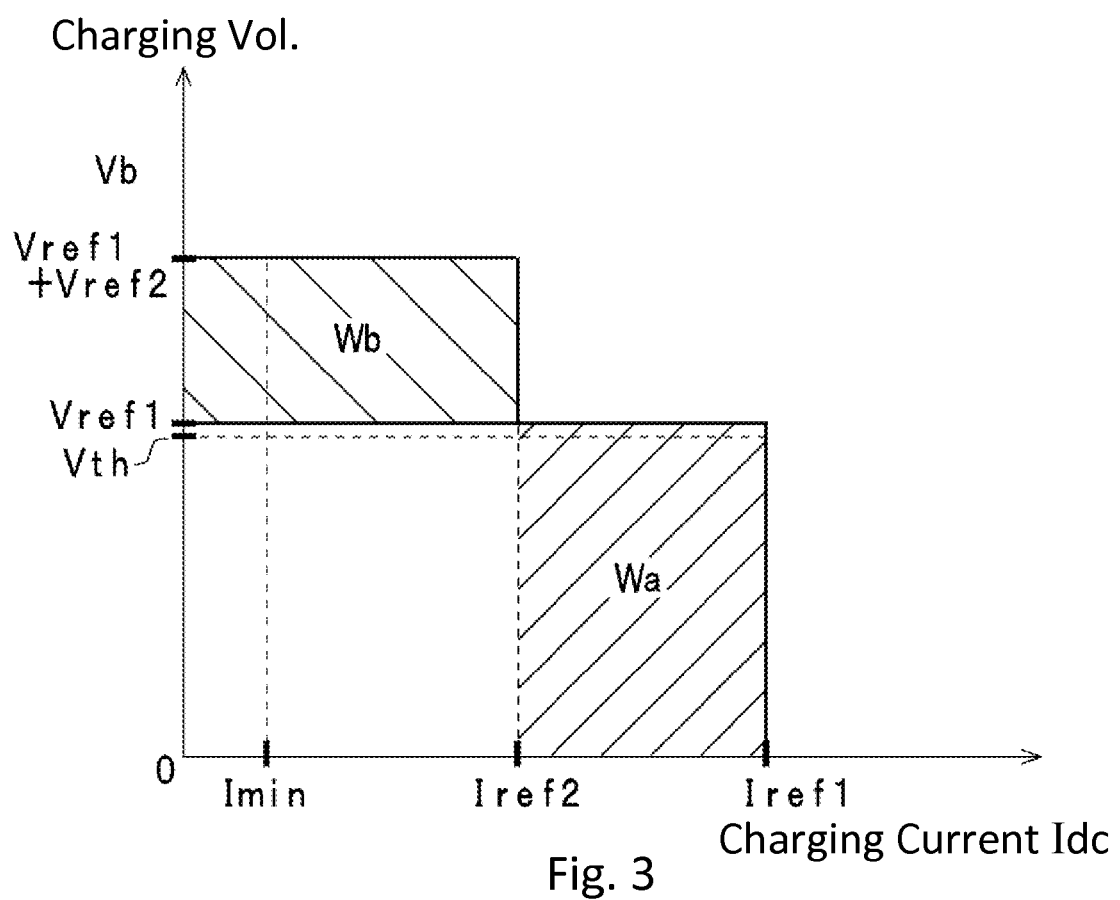
FIG. 3 is an output characteristic diagram that shows a characteristic of a charging voltage Vb and a charging current Idc of a charging device CH according to an embodiment of the present invention.

In this case, the threshold voltage Vth is defined in advance to be either of the maximum output voltage value (the reference voltage value Vref1 in the embodiment) regarding the DC voltage Vdc1 of the power supply device PS and a voltage value that is substantially equal to the maximum output voltage value. Specifically, the voltage value that is substantially equal to the maximum output voltage value corresponds to, for instance, any voltage value that is less than the reference voltage value Vref1 and that is larger than 90 percent of the reference voltage value Vref1, i.e., this voltage value that is somewhat lower than the maximum output voltage value. In the embodiment, as shown in FIG. 3, the threshold voltage Vth is defined to be substantially equal to (and a little bit lower than) the reference voltage value Vref1.

The switching circuit 25 has a switching element (such as a transistor; not shown). The switching element is controlled by the control circuit 29 so as to repeat ON and OFF operations. As a result, the switching circuit 25 performs a switching operation for the external input voltage (the DC voltage Vdc1 in the embodiment) that is input between the positive input terminal 22 and the negative input terminal 23 and that is intermittently applied to the transformer 26. The transformer 26 has, as an example, a primary winding 26a and a secondary winding 26b that are electrically isolated from each other. Further, because the DC voltage is intermittently applied to the primary winding 26a by the switching circuit 25, the transformer 26 induces an AC voltage at the secondary winding 26b.

The rectifying circuit 27 converts the AC voltage that is induced at the secondary winding 26b into a pulsating voltage by rectifying and outputs the pulsating voltage. The smoothing circuit 28 configures a rectification smoothing circuit together with the rectifying circuit 27. The smoothing circuit 28 converts the pulsating voltage that is rectified by the rectifying circuit 27 into a DC voltage Vdc2 by smoothing. Then, the DC voltage Vdc2 is output between a positive output end 28a and a negative output end 28b. Further, the smoothing circuit 28 has a voltage detection unit (not shown) and a current detection unit (not shown). The voltage detection unit is, for instance, configured with a voltage dividing resistance circuit and detects the DC voltage Vdc2. At the same time, the voltage detection unit generates a voltage detection signal Scv and outputs it to the control circuit 29. Specifically, a voltage value of the voltage detection signal Scv changes according to a voltage value of the DC voltage Vdc2. Further, the current detection unit is configured with a detection resistor of which a minute resistance value is, for instance, less than 1Ω. Further, the current detection unit detects a direct current (DC) current Idc2 that is output from the positive output end 28a and the negative output end 28b. At the same time, the current detection unit generates a current detection signal Sci and outputs it to the control circuit 29. Specifically, a voltage value of the current detection signal Sci changes according to a current value Idc2 of the DC current Idc2.

When an operation signal S1 is output from the input voltage detection circuit 24, the control circuit 29 performs a switching control for the switching element of the switching circuit 25. On the other hand, when the operation signal S1 is not output, the control circuit 29 stops performing the switching control for this switching element. In this switching control, the control circuit 29 calculates a voltage value Vdc2 of the present DC voltage Vdc2 based on the voltage detection signal Scv and calculates a current value Idc2 of the present DC current Idc2 based on the current detection signal Sci. Further, the control circuit 29 controls the switching element of the switching circuit 25 so as to make the DC voltage Vdc2 and the DC current Idc2 satisfy with the output characteristic diagram A2 shown in FIG. 2 (current-voltage characteristics), i.e., so as to have a constant current voltage drooping type overcurrent protection characteristic based on the voltage value Vdc2 of the present DC voltage Vdc2 and the current value Idc2 of the present DC current Idc2 that are calculated.

Specifically, the control circuit 29 performs a duty ratio control (or a frequency control) for the switching element of the switching circuit 25. When the current value Idc2 of the DC current Idc2 that is output is less than the reference current value (a maximum output current value) Iref2, the control circuit 29 performs a constant voltage control operation in which the voltage value of the DC voltage Vdc2 is controlled to be a predetermined reference voltage value (the maximum output current value) Vref2 and is outputs. In a state in which the current value Idc2 of the DC current Idc2 reaches the reference current value Iref2, the control circuit 29 performs the constant voltage control operation by which the voltage value Vdc2 of the DC voltage Vdc2 is charged while the current value Idc2 of the DC voltage Vdc2 is maintained (limited) to be the predetermined reference current value Iref2.

A reverse flow prevention rectifying device D1 is, as an example, provided with a diode. As shown in FIG. 1, the reverse flow prevention rectifying device D1 is connected between the positive output end 28a of the smoothing circuit 28 and a positive electrode of the storage battery unit 50 discussed below. At this time, a forward direction of the reverse flow prevention rectifying device D1 faces toward the positive electrode of the storage battery unit 50. In the embodiment, because of the configuration in which the rectifying device D1 is externally attached to the DC-DC converter CNV, the rectifying device D1 is connected between the positive output terminal 30 of the DC-DC converter CNV and the positive electrode of the storage battery unit 50 via a connecting line. However, in the configuration in which the rectifying device D1 is formed inside of the DC-DC converter CNV, the rectifying device D1 is connected between the positive output end 28a of the smoothing circuit 28 and the positive output terminal 30 of the DC-DC converter CNV. Further, when the smoothing circuit 28 has a function to prevent a current from flowing in from the positive output end 28a, the rectifying device D1 can be omitted.

A bypass rectifying device D2 is, as an example, provided with a diode. As shown in FIG. 1, the bypass rectifying device D2 is connected between the negative output terminal 31 of the DC-DC converter CNV and the positive electrode of the storage battery unit 50 (a node connected between the positive electrode and a cathode terminal of the diode that configures the rectifying device D1). At this time, a forward direction of the bypass rectifying device D2 faces toward the positive electrode of the storage battery unit 50. Further, as explained above, in the configuration in which the reverse flow prevention rectifying device D1 is formed inside of the DC-DC converter CNV, a configuration, in which the bypass rectifying device D2 is formed inside of the DC-DC converter CNV with a state in which the bypass rectifying device D2 is connected between the positive output terminal 30 and the negative output terminal 31 of the DC-DC converter CNV and a forward direction of the bypass rectifying device D2 faces toward the positive output terminal 30, can also be adopted.

In the charging device CH explained above, the positive output terminal 10 of the power supply device PS and the positive input terminal 22 of the DC-DC converter CNV are connected to each other via a connecting line. In addition, the negative output terminal 11 of the power supply device PS and the negative input terminal 23 of the DC-DC converter CNV are connected to each other via the connecting line. Further, because the positive output terminal 10 of the power supply device PS and the negative output terminal 31 of the DC-DC converter CNV are connected to each other via the connecting line, the power supply device PS and the DC-DC converter CNV are connected to each other in series, i.e., an output stage of the power supply device PS and an output stage of the DC-DC converter CNV are connected to each other in series.

Further, the positive output terminal 10 of the power supply device PS and the negative output terminal 31 of the DC-DC converter CNV are connected to an anode terminal of a diode that configures the rectifying device D2. The positive output terminal 30 of the DC-DC converter CNV is connected to an anode terminal of a diode that configures the rectifying device D1. Further, a node between the rectifying devices D1 and D2 (cathode terminals of the diodes that respectively configure the rectifying devices D1 and D2) is connected to the positive electrode of a battery as a charging target (the storage battery unit 50) via the connecting line. Because the negative output terminal 11 of the power supply device PS and the negative electrode of the storage battery unit 50 are connected to each other via the connecting line, the storage battery unit 50 is connected between the positive output terminal 30 of the DC-DC converter CNV and the negative output terminal 11 of the power supply device PS.

Therefore, in the charging device CH, the DC voltages Vdc1 and Vdc2 of the power supply device PS and the DC-DC converter CNV, respectively, are added. In addition, the added DC voltage is output to the storage battery unit 50. The storage battery unit 50 is charged to a sum of the reference voltage value Vref1 and Vref2 (the total voltage value) by the DC current Idc (also referred to as a "charging current Idc") that is output from the charging device CH.

Next, an operation of the charging device CH is explained. In the following explanation, each of the rectifying devices D1 and D2 is an ideal rectifying device so that its voltage drop corresponds to zero volts in order to easily comprehend the invention.

In the charging device CH, first of all, the power supply device PS starts to output the DC voltage Vdc1. Specifically, when the charging voltage Vb of the storage battery unit 50 during an initial phase of the charging is lower than the reference voltage value Vref1 (more specifically, when the charging voltage Vb is lower than the threshold voltage Vth), in the power supply device PS, at first, the control circuit 9 increases a duty ratio of the switching element of the switching circuit 5 so as to regulate the voltage value Vdc1 of the DC voltage Vdc1 to be the reference voltage value Vref1. However, the voltage value Vdc1 of the DC voltage Vdc1 is regulated to the charging voltage Vb of the storage battery unit 50.

In this case, in the DC-DC converter CNV, the input voltage detection circuit 24 stops to output the operation signal S1 because the voltage value Vdc1 of the DC voltage Vdc1 that is detected by the input voltage detection circuit 24 is lower than the threshold voltage Vth. As a result, because the control circuit 29 does not perform ON and OFF control of the switching element of the switching circuit 25, the DC-DC converter CNV is maintained to be in a stop operation state (i.e., a state in which the output of the DC voltage Vdc2 is stopped). Therefore, in the charging device CH, only the power supply device PS operates and outputs the DC current Idc1 with the DC voltage Vdc1. At this time, the DC current Idc1 that is output from the power supply device PS is output to the storage battery unit 50 via the bypass rectifying device D2.

At this time, the DC current Idc1 is supplied to the storage battery unit 50 as the charging current Idc. Further, until a voltage value of the charging voltage Vb of the storage battery unit 50 reaches a predetermined charging voltage value (the total voltage value of the reference voltage values Vref1 and Vref2), the charging current Idc flows in the storage battery unit 50 as a large current value. Therefore, in the power supply device PS, the control circuit 9 controls the duty ratio for the switching element of the switching circuit 5 and performs an operation for maintaining the current voltage Idc1 (in this case, the current voltage Idc1 can also be a current value of the charging current Idc) to the reference current value Iref1. That is, a constant current voltage drooping type overcurrent protective function is operated.

As a result, as shown in FIG. 3, until the charging of the storage battery unit 50 proceeds and the charging voltage Vb (in this case, the DC voltage Vdc1) reaches the reference voltage value Vref1, the charging device CH (in this case, the power supply device PS) performs the constant-current charging that by which the current value of the charging current Idc is output to the storage battery unit 50 while the current value of the charging current Idc is maintained to be the reference current value Iref1.

After that, when the charging of the storage battery unit 50 processes and the charging voltage Vb (in this case, the DC voltage Vdc1) reaches the threshold voltage Vth, the input voltage detection circuit 24 starts to output the operation signal S1 in the DC-DC converter CNV. As a result, in the DC-DC converter CNV, because the control circuit 29 starts to perform ON and OFF control for the switching element of the switching circuit 25, the DC-DC converter CNV starts to output the DC voltage Vdc2.

Therefore, in this state, a sum of the DC voltage Vdc2 that is output from the DC-DC converter CNV and the DC voltage Vdc1 that is output from the power supply device PS is supplied to the storage battery unit 50. In this case, an added voltage value (the total voltage value) of the DC voltages Vdc1 and Vdc2 is regulated to the charging voltage Vb of the storage battery unit 50. Thus, when the charging voltage Vb increases, the added voltage value (the total voltage value) increases.

Therefore, during an initial phase for output of the DC voltage Vdc2 by the DC-DC converter CNV, because the voltage value of the DC voltage Vdc2 is less than the reference voltage value Vref2, the control circuit 29 of the DC-DC converter CNV increases the duty ratio of the switching element of the switching circuit 25 so as to regulate the voltage value Vdc2 of the DC voltage Vdc2 to the reference voltage value Vref2. However, as explained above, the added voltage value of the DC voltages Vdc1 and Vdc2 is regulated to the charging voltage Vb of the storage battery unit 50. At the same time, the DC voltage Vdc1 is equal to the threshold voltage Vth (the voltage value that is close to the reference voltage value Vref1). Therefore, the voltage value Vdc2 of the DC voltage Vdc2 is suppressed to be a low voltage and after that, increases according to the increase of the charging voltage Vb.

In this state, even after the DC-DC converter CNV starts to output the DC voltage Vdc2, until the voltage value of the charging voltage Vb of the storage battery unit 50 reaches the predetermined charging voltage value (the total voltage value of each of the reference voltage values Vref1 and Vref2), the charging current Idc flows into the storage battery unit 50 with a large current value. However, in the charging device CH, because the DC-DC converter CNV that starts to output the DC voltage Vdc2 operates the constant current voltage drooping type overcurrent protection characteristic, the current value of the charging current Idc is limited. That is, because the control circuit 29 of the DC-DC converter CNV controls the duty ratio for the switching element of the switching circuit 25, the current value Idc2 of the DC current Idc2, i.e., the current value of the charging current Idc, is maintained as the reference current value Iref2 (Iref2<Iref1).

As a result, as shown in FIG. 3, until the voltage value of the charging voltage Vb of the storage battery unit 50 reaches the total voltage value of the reference voltage values Vref1 and Vref2, the charging device CH (in this case, the power supply device PS and the DC-DC converter CNV) performs the constant-current charging by which the current value of the charging current Idc is regulated to the reference current value Iref2 and is output to the storage battery unit 50.

In this state, a part of the DC current Idc1 that is output from the power supply device PS is output (is supplied) to the storage battery unit 50 as the charging current Idc. The rest of the DC current Idc1 is output (is supplied) to the DC-DC converter CNV.

In this case, in order to easily comprehend the embodiment, if efficiency of the DC-DC converter CNV is 100% and when the current value Idc2 of the DC current Idc2 that is output from the DC-DC converter CNV corresponds to the reference current value Iref2, a current value of a DC current Idc3 (this current value is also referred to as a "current value Idc3" in the embodiment) that is supplied to the DC-DC converter CNV from the power supply device PS is indicated by a formula as below.

Current Value $Idc3 = Vdc2 \times Iref2 / Vdc1$

Further, the current value Idc1 of the DC current Idc1 that is output from the power supply device PS corresponds to a total value of each of the DC current values Idc2 (=Iref2) and Idc3. Therefore, the DC current value Idc1 is indicated by a formula as follow.

$$\text{Current Value } Idc1 = Iref2 + Vdc2 \times Iref2 / Vdc1$$
$$= Iref2(1 + Vdc2/Vdc1)$$

As discussed in the above embodiment, when the threshold voltage Vth is defined to be the same voltage as the reference voltage value Vref1 or to be somewhat lower voltage value than the reference voltage value Vref1, the voltage value Vdc1 of the DC voltage Vdc1 that is output from the power supply device PS increases to the reference voltage value Vref1 in a short period of time after the voltage value Vdc1 reaches the threshold voltage Vth. After the voltage value Vdc1 of the DC voltage Vdc1 reaches the reference voltage value Vref1 in the manner described above, in the power supply device PS, the control circuit 9 performs the constant voltage control operation by which the voltage value Vdc1 of the DC voltage Vdc1 is maintained as the reference voltage value Vref1 while the control circuit 9 controls the duty ratio for the switching element of the switching circuit 5.

As a result, after the voltage value Vdc1 of the DC voltage Vdc1 reaches the reference voltage value Vref1, because the voltage value Vdc1 as a parameter of the above formula of the current value Idc1 is the reference voltage value Vref1 as a constant value, the voltage value Vdc2 as a parameter of the same formula gradually increases from a satisfactory lower value than the voltage value Vdc1 according to the increase of the charging voltage Vb of the storage battery unit 50. Therefore, the current value Idc1 of the DC current Idc1 gradually increases from a current value that is substantially equal to the reference current value Iref2.

As explained above, when the charging device CH charges the storage battery unit 50, the reference voltage value Vref2 and the reference current value Iref2 are regulated so as to make the maximum power value ((Vref1+Vref2)×Iref2) that is supplied to the storage battery unit 50 be less than the maximum power value (Vref1×Iref1) that the power supply device PS can output. That is, electric power Wa (Wa=(Iref1−Iref2)×Vref1) shown in FIG. 3 is regulated to be larger than electric power Wb (Wb=Vref2×Iref2) shown in FIG. 3. In other words, when the DC-DC converter CNV starts to operate, i.e., when the constant current charging is started by the reference current value Iref2 in the charging device CH, surplus electric power of the power supply device PS is regulated to be larger than the electric power Wb.

As a result, the power supply device PS together with the DC-DC converter CNV continue to supply the DC current Idc2 of the reference current value Iref2 to the storage battery unit 50 while the power supply device PS adequately supplies the DC current Idc3 of the current value Idc3 to the DC-DC converter CNV that starts to operate.

Thus, the charging voltage Vb of the storage battery unit 50 gradually increases, and after that, it reaches the total voltage value of the reference voltage values Vref1 and Vref2 (Vref1+Vref2). After the charging voltage Vb of the storage battery unit 50 reaches the total voltage value (Vref1+Vref2), in the DC-DC converter CNV, the control circuit 29 performs the constant voltage control by which the voltage value Vdc2 of the DC voltage Vdc2 is maintained as the reference voltage value Vref2 while the control circuit 29 controls the duty ratio for the switching element of the switching circuit 25. Therefore, the charging device CH shifts the charging operation from the constant current charging of the reference current value Iref 2 to the constant voltage charging of the constant voltage value (Vref1+Vref2).

Thus, in the charging device CH, when the charging voltage Vb of the storage battery unit 50 is lower than the threshold voltage Vth, i.e., a low voltage, only the power supply device PS is shifted to the operating state and performs the charging for the storage battery unit 50. After that, when the charging voltage Vb reaches the threshold voltage Vth, the DC-DC converter CNV is shifted to the operating state as well and performs the charging for the storage battery unit 50 along with the power supply device PS. Thus, the power supply device PS and the DC-DC converter CNV in which their output terminals are connected in series are sequentially shifted to the operating state in the order as explained above and charge the storage battery unit 50.

Therefore, the charging device CH can also charge the storage battery unit 50 in which the charging voltage Vb is a low voltage. Further, in the charging device CH, when the charging voltage Vb is a low voltage (i.e., the power supply efficiency decreases), only the power supply device PS charges the storage battery unit 50. When the charging voltage Vb reaches the threshold voltage Vth, i.e., when the charging voltage Vb becomes high to some extent, the DC-DC converter CNV is shifted to the operating state and the storage battery unit 50 is charged to be a higher charging voltage Vb by the power supply device PS and the DC-DC converter CNV. Therefore, in the charging device CH, the occurrence of a state, in which the power supply device PS and the DC-DC converter CNV operates at the same time in a state of low power supply efficiency (for instance, the power supply device PS outputs the DC voltage Vdc1 with less than 20% of the reference voltage value Vref1 and the DC-DC converter CNV outputs the DC voltage Vdc2 with less than 20% of the reference voltage value Vref2) can be avoided. Therefore, the deterioration of the power supply efficiency as the entire charging device CH is decreased.

Further, when the charging device CH starts the charging operation for the storage battery unit 50, the charging voltage Vb of the storage battery unit 50 may be higher than threshold voltage Vth. In this case, right after the power supply device PS starts the charging operation and starts to output the DC voltage Vdc1, the voltage value Vdc1 of the DC voltage Vdc1 exceeds the threshold voltage Vth. Therefore, the DC-DC converter immediately starts to perform the operation as well. As explained above, the charging device CH performs the constant current control by which the current value of the charging current Idc is regulated to the reference current value Iref2 and is output to the storage battery unit 50. Further, the charging device CH starts to charge the storage battery unit 50. However, even at this time, the following situation can be avoided. The power supply device PS and the DC-DC converter CNV operate in the state in which both of the voltage values Vdc1 and Vdc2 of the DC voltages Vdc1 and Vdc2 are low. As a result, the deterioration of the power supply efficiency as an entire charging device CH is avoided.

Thus, when the constant voltage charging is continuously performed with the constant voltage value (Vref1+Vref2) by the charging device CH, the current value of the charging current Idc that is supplied to the storage battery unit 50 gradually decreases from the reference current value Iref2. Therefore, when the current value of the charging current Idc reaches a minimum (lower limit) current value Imin (Imin<Iref2), the control circuit 9 of the power supply device PS stops the operation for generating the DC voltage Vdc1 (the DC voltage Vdc becomes zero volts) by controlling the switching element of the switching circuit 5 to be in an OFF state. As a result, the DC-DC converter CNV stops the operation as well and the charging for the storage battery unit 50 by the charging device CH is completed.

Thus, in the charging device CH, the output terminal of the DC-DC converter CNV is connected in series to the output terminal of the power supply device PS. Specifically, the power supply PS is shifted to the operation state first and starts to output the DC voltage Vdc1. The DC-DC converter CNV is shifted to the operation state by using the DC voltage Vdc1 as an operation voltage. In other words, when the DC voltage Vdc1 reaches the threshold voltage Vth that is either of the maximum output voltage value (the reference voltage value Vref1) of the DC voltage Vdc1 and its neighboring voltage value of the maximum output voltage value, the DC-DC converter CNV is shifted to the operating state. As a result, the charging device CH supplies the charging current Idc of the constant reference current value Iref2 to the storage battery unit 50.

Therefore, according to the charging device CH, the storage battery unit 50 in which the charging voltage Vb is a low voltage that is less than the threshold voltage Vth is efficiently charged by only the power supply device PS until the charging voltage Vb reaches the threshold voltage Vth. After the charging voltage Vb reaches the threshold voltage Vth (when the charging voltage Vb is high to some extent), the storage battery unit 50 can be charged to the higher charging voltage Vb (the total voltage value of the each of the reference voltage values Vref1 and vref2) by the power supply device PS and the DC-DC converter CNV. Therefore, according to the charging device CH, while the power supply efficiency of the entire charging device CH can be kept high, the storage battery unit 50 can be charged regardless of its charging voltage states in which the charging voltages Vb are low and high voltages.

In the embodiment explained above, the input voltage detection circuit 24 of the DC-DC converter CNV detects the voltage value Vdc1 of the DC voltage Vdc1 that is output from the power supply device PS and compares the voltage value Vdc1 with the threshold voltage Vth. Before the operation of the DC-DC converter CNV is shifted to the operation state, the voltage value of the charging voltage Vb of the storage battery unit 50 corresponds to a voltage that is lower than the voltage value Vdc1 of the DC voltage Vdc1 by a forward voltage of the rectifying device D2, but that is substantially equal to the voltage value Vdc1 of the DC voltage Vdc1. Therefore, the input voltage detection circuit 24 of the DC-DC converter CNV can detect the charging voltage Vb of the storage battery unit 50 and compare the charging voltage Vb with the threshold voltage Vth.

Second Embodiment

A second embodiment of a charging device CH2 of the present invention will be explained below with reference to the drawings.

The configuration of the charging device CH2 shown in FIG. 4 will be explained. The charging device CH2 is configured with "n" (n corresponds to an integer of two or more) power supply devices PS (in the embodiment, as an example, two power supply devices PS1 and PS2) and a power supply control device CNT. Specifically, the power supply control device CNT is provided outside of each of the power supply devices PS1 and PS2 and performs integrated control for each of the power supply devices PS1 and PS2.

Figure 4:
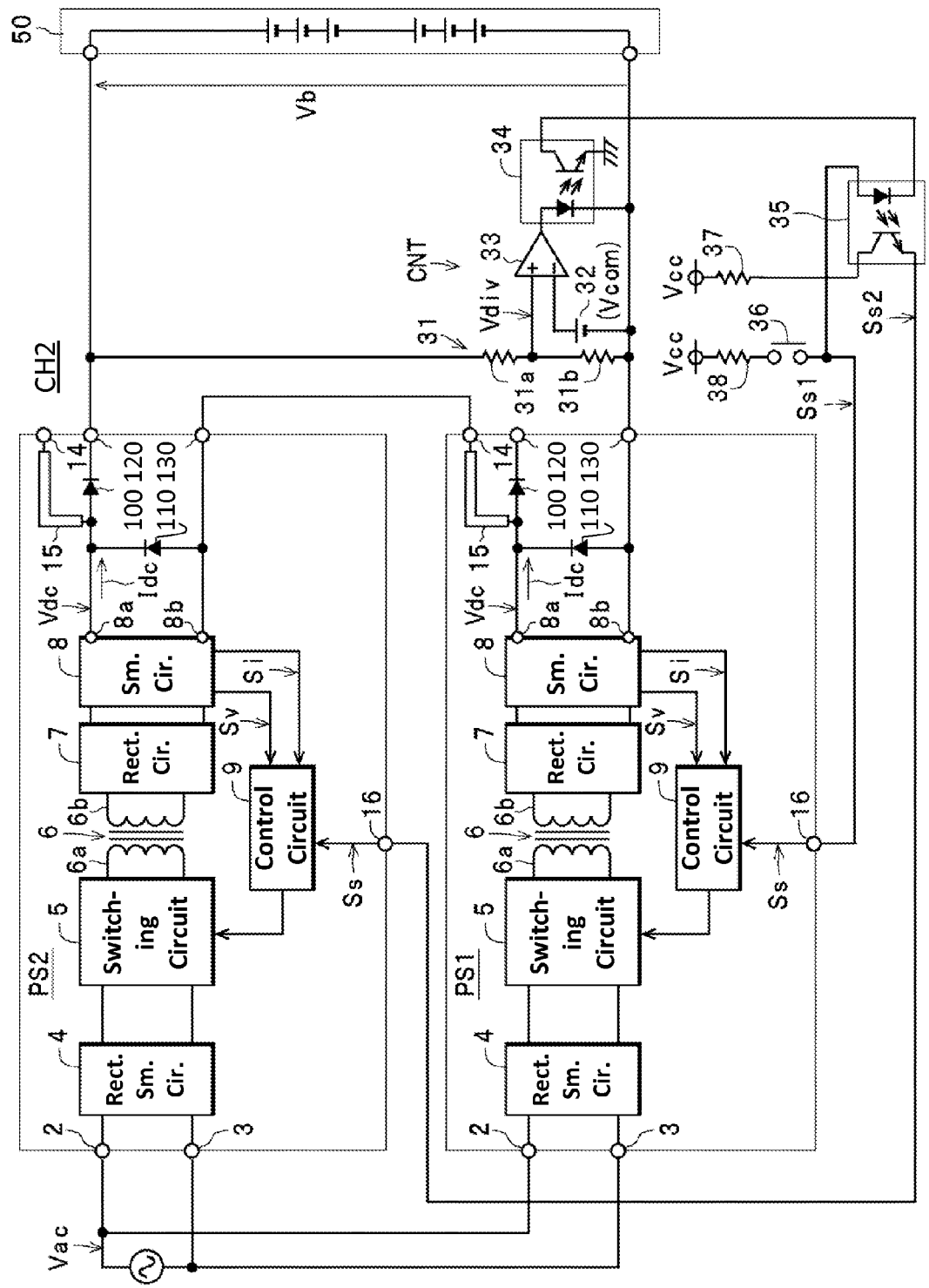
FIG. 4 is a circuit diagrams that shows a configuration of a charging device CH2 that is provided with two power supply devices PS (PS1, PS2) according to an embodiment of the present invention.

Each power supply device PS shown in FIG. 4 is configured with a positive input terminal 2, a negative input terminal 3, a rectification smoothing circuit 4, a switching circuit 5, a transformer 6, a rectifying circuit 7, a smoothing circuit 8, a control circuit 9, a reverse flow prevention rectifying device 100, a bypass rectifying device 110, a positive output terminal 120, a negative output terminal 130, a serial connection terminal 14, a bus bar 15 and a control input terminal 16. As discussed below, each of the power supply devices PS is different with respect to a constant current voltage drooping type overcurrent protection characteristic, however, a basic configuration of each of the power supply devices PS are the same. Each of the power supply devices PS is configured as an insulated converter that converts an external input voltage that is input between the positive input terminal 2 and the negative input terminal 3 into a DC voltage Vdc of a constant voltage value and that outputs the DC voltage Vdc. Specifically, the external input voltage in the embodiment corresponds to an AC voltage Vac. However, the external input voltage can also correspond to a DC voltage. Further, the power supply device PS can be configured with various insulated converters such as forward, flyback, bridge and push-pull converters as long as it is an insulated converter.

The rectification smoothing circuit 4 converts an AC voltage Vac to a DC voltage by rectifying and smoothing the AC voltage Vac and outputs the DC voltage. When a DC voltage is input instead of the AC voltage Vac, a smoothing circuit can be used instead of the rectification smoothing circuit 4. Further, when the number of ripples of the DC voltage that is input is small, the rectification smoothing circuit 4 can be omitted. The switching circuit 5 has a switching element (such as a transistor; not shown). The switching element is controlled by the control circuit 9 so as to repeat ON and OFF operations. As a result, the switching circuit 5 performs a switching operation for the DC voltage (i.e., an input voltage in the switching circuit 5) that is output from the rectification smoothing circuit 4 and intermittently applies the DC voltage to the transformer 6.

The transformer 6 has, as an example, a primary winding 6a and a secondary winding 6b that are electrically isolated from each other. Further, because the DC voltage is intermittently applied to the primary winding 6a by the switching circuit 5, the transformer 6 induces an AC voltage at the secondary winding 6b.

The rectifying circuit 7 converts the AC voltage that is induced at the secondary winding 6b into a pulsating voltage by rectifying and outputs the pulsating voltage. The smoothing circuit 8 configures a rectification smoothing circuit together with the rectifying circuit 7. The smoothing circuit 8 converts the pulsating voltage that is rectified by the rectifying circuit 7 into a DC voltage Vdc by smoothing. Then, the DC voltage Vdc is output between the positive output end 8a and the negative output end 8b. Further, the smoothing circuit 8 has a voltage detection unit (not shown) and a current detection unit (not shown). The voltage detection unit is, for instance, configured with a voltage dividing resistance circuit and detects the DC voltage Vdc. At the same time, the voltage detection unit generates a voltage detection signal Sv and outputs it to the control circuit 9. Specifically, a voltage value of the voltage detection signal Sv changes according to a voltage value of the DC voltage Vdc. Further, the current detection unit is configured with a detection resistor of which a minute resistance value is, for instance, less than 1Ω. Further, the current detection unit detects a direct current (DC) current Idc that is output from the positive output end 8a and the negative output end 8b. At the same time, the current detection unit generates a current detection signal Si and outputs it to the control circuit 9. Specifically, a voltage value of the current detection signal Si changes according to a current value of the DC current Idc.

When an operation instruction signal Ss is input to the control circuit 9 from outside via the control input terminal 16, the control circuit 9 performs the switching control for the switching element of the switching circuit 5. In this switching control, the control circuit 9 calculates a voltage value of the present DC voltage Vdc based on the voltage detection signal Sv and calculates a current value of the present DC current Idc based on the current detection signal Si. Further, the control circuit 9 controls the switching element of the switching circuit 5 so as to make the DC voltage Vdc and the DC current Idc change with a relationship (a current voltage output characteristic) shown in FIG. 6 based on the voltage value of the present DC voltage Vdc and the current value of the present DC current Idc that are calculated.

Figure 5:
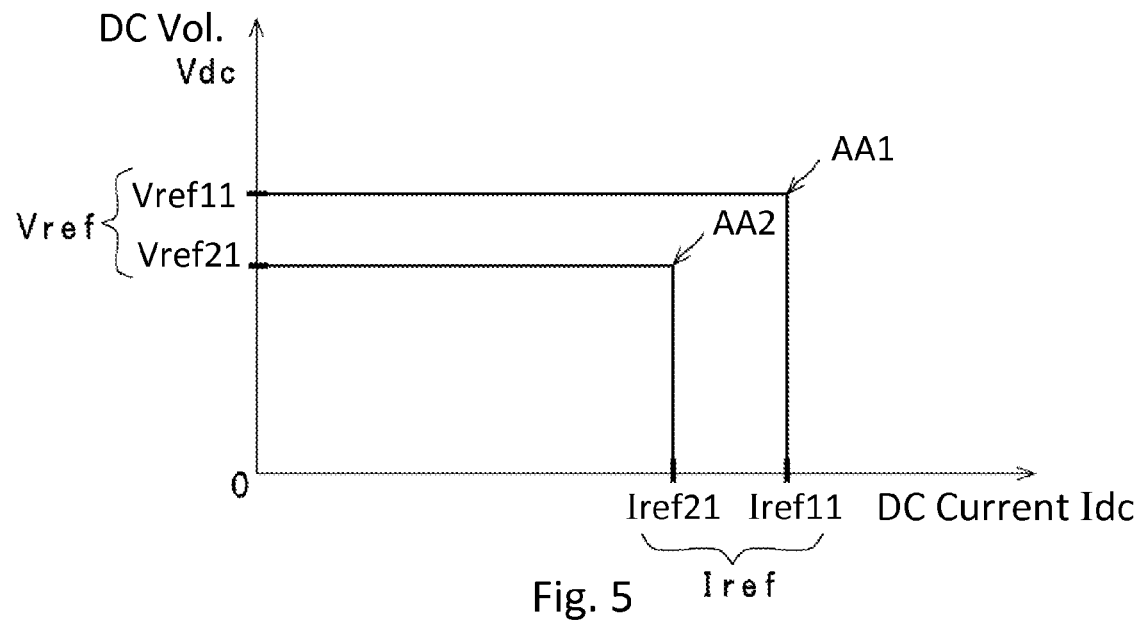
FIG. 5 is an output characteristic diagram that shows a characteristic of a DC voltage Vdc and a DC current Idc of each of power supply devices PS1 and PS2 according to an embodiment of the present invention.

Specifically, the current value of the DC current Idc is less than a reference current value (a maximum output current value) Iref, the control circuit 9 performs the duty ratio control (or a frequency control) for the switching element of the switching circuit 5. As a result, the control circuit 9 performs a constant voltage control operation by which the voltage value of the DC voltage Vdc is controlled to the reference voltage value (the maximum output voltage value) Vref and is output. When the current value of the DC current Idc reaches the reference current value Iref, the control circuit 9 performs a constant current control operation by which the voltage value of the DC voltage Vdc decrease while the current value of the DC current Idc is maintained (controlled) as the reference current value Iref. In the embodiment, as shown in FIG. 5, the reference voltage value Vref corresponds to a reference voltage value Vref11 in the power supply device PS1 and corresponds to a reference voltage value Vref21 (Vref21<Vref11) in the power supply device PS2. Further, the reference current value Iref corresponds to a reference current value Iref11 in the power supply device PS1 and corresponds to a reference current voltage Iref21 (Iref21<Iref11) in the power supply device PS2.

As a result, the power supply device PS1 has a current voltage output characteristic that has a constant current voltage drooping type overcurrent protection characteristic that is indicated by the arrow AA1 in FIG. 5. Further, the power supply device PS2 has a current voltage output characteristic that has a constant current voltage drooping type overcurrent protection characteristic that is indicated by the arrow AA2 in FIG. 5.

The reverse flow prevention rectifying device 100 is, for example, configured with a diode and is connected in advance between the positive output end 8a of the smoothing circuit 8 and the positive output terminal 120 as shown in FIG. 4. At this time, a forward direction of the reverse flow prevention rectifying device 100 faces toward the positive output terminal 120. The bypass rectifying device 110 is connected in advance between the positive output end 8a and the negative output end 8b of the smoothing circuit 8. At this time, a forward direction of the bypass rectifying device 110 faces toward the positive output end 8a. Specifically, the reverse flow prevention rectifying device 100 and the bypass rectifying device 110 are mounted on a circuit board (not shown) in the same manner as other electronic parts (not shown) that configure the power supply device PS. Therefore, the reverse flow prevention rectifying device 100 and the bypass rectifying device 110 are connected in advance to positions explained above, i.e., they are formed inside the power supply device PS.

Further, at least one rectifying device of the reverse flow prevention rectifying device 100 and the bypass rectifying device 110 is attached to the bus bar 15 under a good thermally conductive condition while the at least one rectifying device is electrically isolated from the bus bar 15. Due to this configuration, the bus bar 15 works as a radiator of the rectifying device. In the embodiment, the reverse flow prevention rectifying device 100 is attached to the bus bar 15.

The serial connection terminal 14 is connected to the positive output end 8a of the smoothing circuit 8. Specifically, the serial connection terminal 14 is connected to the positive output end 8a via the bus bar 15 that is composed of a metal conductor. The negative output terminal 130 is connected to the negative output end 8b of the smoothing circuit 8. Thus, the serial connection terminal 14 is connected to the positive output end 8a of the smoothing circuit 8 and the positive output terminal 120 is connected to the positive output end 8a via the reverse flow prevention rectifying device 100. Further, the negative output terminal 130 is connected to the negative output end 8b of the smoothing circuit 8. As a result, the DC voltage Vdc is output between the positive output terminal 120 and the negative output terminal 130 and is also output between the serial connection terminal 14 and the negative output terminal 130. Therefore, the serial connection terminal 14 works as another positive output terminal that is different from the positive output terminal 120.

The power supply devices PS1 and PS2 that are configured as explained above are connected to each other in series by connecting the negative output terminal 130 of the power supply device PS2 located at a high potential side and the positive output terminal (in the embodiment, the serial connection terminal 14) of the power supply device PS1 located at a low potential side by a connecting line. Further, the positive output terminal 120 of the power supply device PS (in the embodiment, the power supply device PS2) that is located at a highest potential side is connected to a positive electrode of the storage battery unit 50 by the connecting line. The negative output terminal 130 of the power supply device PS (in the embodiment, the power supply device PS1) that is located at a lowest potential side is connected to a negative electrode of the storage battery unit 50 by the connecting line. Therefore, the DC voltage Vdc of each of the power supply devices PS1 and PS2 is added and is output to the storage battery unit 50 between the positive output terminal 120 of the power supply device PS2 and the negative output terminal 130 of the power supply device PS1. Further, the storage battery unit 50 is, as an example, configured by connecting a plurality of storage batteries in series.

Further, in the charging device CH2, all of "n" (in the embodiment, two) power supply devices PS that are connected in series are provided with the bypass rectifying device 110 as explained above. Therefore, the bypass rectifying device 110 as a rectifying device is connected between the positive output terminal 120 and the negative output terminal 130 of each of the power supply devices PS (in the embodiment, between the positive output terminal 120 and the negative output terminal 130 via the reverse flow prevention rectifying device 100). At this time, a forward direction of the bypass rectifying device 110 faces toward the positive output terminal 120. However, the bypass rectifying device 110 should be provided to all the power supply devices PS except the first one ((n−1) power supply devices PS). The one power supply device PS (in the embodiment, the power supply device PS1) is shifted to operate first by the power supply control device CNT. The one power supply device PS that is the first to operate always operates while the charging device CH2 performs the charging operation to the storage battery unit 50. Therefore, the one power supply device PS (PS1) in which the bypass rectifying device 110 may not be provided can be adopted. That is, the bypass rectifying device 110 should be provided to at least the other power supply devices PS ((n−1) power supply devices).

The power supply control device CNT is configured with, as shown in FIG. 4, a voltage detection circuit 31, a reference power supply 32, a comparator 33, photocouplers 34 and 35, a starting switch 36, and resistors 37 and 38. Specifically, the resistor 37 pulls up a collector terminal of the transistor that is included in the photocoupler 35 to the external power supply voltage Vcc. The resistor 38 pulls up one terminal of the starting switch 36 to the external power supply voltage Vcc.

The voltage detection circuit 31 is configured with a voltage dividing circuit that is composed with two resistors 31a and 31b that are connected in series. Further, the voltage detection circuit 31 are connected between the positive output terminal 120 of the power supply device (the power supply device PS2 in the embodiment) that is located at the highest potential side and the negative output terminal 130 of the power supply device (the power supply device PS1 in the embodiment) that is located at the lowest potential side. Further, the voltage detection circuit 31 outputs a divided voltage Vdiv in which a voltage value is changed according to the voltage value of the charging voltage Vb by dividing the charging voltage Vb of the storage battery unit 50. Specifically, the charging voltage Vb of the storage battery unit 50 corresponds to an added voltage (the output voltage of the power supply system CH2) of the DC voltage Vdc that is output from each of the power supply devices PS1 and PS2.

The reference power supply 32 generates and outputs a comparison voltage Vcom of a predetermined voltage by using a potential of the negative output terminal 130 of the power supply device PS1 as a standard. The comparator 33 compares the comparison voltage Vcom with the divided voltage Vdiv. As a result, when the divided voltage Vdiv is equal to or less than the comparison voltage Vcom, the comparator 33 outputs an L level voltage that is the same potential as the negative output terminal 130. Similarly, when the divided voltage Vdiv exceeds the comparison voltage Vcom, the comparator 33 outputs an H level voltage that is a higher voltage than a forward voltage of a diode. In this embodiment, when the charging voltage Vb reaches a threshold voltage that is defined in advance, i.e., when the charging voltage Vb reaches a voltage value of the reference voltage value of the power supply device PS or a vicinity voltage value thereof (for instance, the voltage value is about 80% of the reference voltage value, see FIG. 6), a division rate for resistors 31a and 31b and the comparison voltage Vcom are defined in advance so as to make the divided voltage Vdiv exceed the comparison voltage Vcom and make the comparator 33 output the H level voltage.

An anode terminal of a photodiode of the photocoupler 34 is connected to an output terminal of the comparator 33. At the same time, a cathode terminal of the photodiode of the photocoupler 34 is connected to a potential of the negative output terminal 130 in the power supply device PS1. Further, an emitter terminal of a phototransistor of the photocoupler 34 is connected to a reference potential (a ground potential)

with respect to an external power supply voltage Vcc. At the same time, a collector terminal of the phototransistor of the photocoupler 34 is connected to a cathode terminal of a photodiode of the photocoupler 35.

An anode terminal of the photodiode of the photocoupler 35 is connected to one terminal of the starting switch 36. At the same time, the cathode terminal of the photodiode of the photocoupler 35 is connected to the photocoupler 34 as explained above. Further, an emitter terminal of a phototransistor of the photocoupler 35 is connected to the control input terminal 19 of the power supply device PS2 located at a high potential side. At the same time, a collector terminal of the phototransistor of the photocoupler 35 is pulled up to the external power supply voltage Vcc through the resistor 37 as explained above. When the phototransistor is in an ON state, the photocoupler 35 outputs the H level signal (the voltage that is substantially equal to the voltage value of the external power supply voltage Vcc) to the power supply device PS2 from the emitter terminal of the phototransistor as the operation instruction signal Ss (an operation instruction signal Ss2).

The other terminal of the starting switch 36 is pulled up to the external power supply voltage Vcc as explained above. At the same time, one terminal of the starting switch 36 is connected to the control input terminal 16 of the power supply device PS1 located at a low potential side. According to this configuration, when the starting switch 36 is set to be in an ON state, the starting switch 36 outputs an H level signal (a voltage as substantially the same as the voltage value of the external power supply voltage Vcc) as an operation instruction signal Ss (the operation instruction signal Ss1).

Next, an operation of the charging device CH2 will be explained.

In the external control circuit CNT, when the starting switch 36 is in an OFF state, the operation instruction signal Ss1 is not output to the power supply device SP1. Further, the H level signal is not applied to the anode terminal of the photodiode of photocoupler 35. Therefore, because the phototransistor of the photocoupler 35 is also in the OFF state, the operation instruction signal Ss2 is not output to the power supply device PS2 as well. As a result, both power supply devices PS1 and PS2 are maintained to stop (to be in a stop operation state).

In the state explained above, when the starting switch 36 is operated to be in the ON state, the operation instruction signal Ss1 is output to the power supply device SP1. As a result, in the power supply device PS1, the control circuit 9 starts to perform the switching control for the switching element of the switching circuit 5 (shifting to an operating state). When the charging voltage Vb of the storage battery unit during an initial charging phase is lower than the reference voltage value Vref11, the power supply device PS1 regulates a current value of a present DC current Idc as the reference current value and performs constant current control so as to output the regulated current to the storage battery unit 50 until the charging voltage Vb of the storage battery unit 50 reaches the threshold voltage value Vth. In the above case, because the power supply device PS2 is in a stop operation state as discussed below, the above charging voltage Vb corresponds to a voltage that is obtained by subtracting a forward voltage Vf of each of the diodes 100 and 110 of the power supply device PS2 from the DC voltage Vdc that is output from the power supply device PS1.

On the other hand, although the H level signal is applied to the anode terminal of the photodiode of the photocoupler 35, the divided voltage Vdiv that is output from the voltage detection circuit 31 is less than the comparison voltage Vcom that is output from the reference power supply 32 until the charging voltage Vb reaches the threshold voltage Vth as discussed above. Therefore, because the comparator 33 outputs the L level voltage, the phototransistor of the photocoupler 34 maintains the OFF state. Thus, because a current does not flow in the photodiode of the photocoupler 35, the phototransistor of the photocoupler 35 maintains the OFF state. Therefore, since the operation instruction signal Ss2 is not applied to the power supply device PS2 located at the high potential side, the power supply device PS2 maintains the stop operation state.

As a result, the DC current Idc that is output from the power supply device PS1 is supplied to the storage battery unit 50 after the DC current Idc passes through the negative output terminal 130 of the power supply device PS2, the bypass rectifying device 110, the reverse flow prevention rectifying device 100 and the positive output terminal 120. In other words, the DC current Idc flows by bypassing the power supply device PS2 that is in the stop operation state. Thus, the charging by the constant current (the reference current value Vref11) for the storage battery unit 50 is performed.

Because the storage battery unit 50 is further charged by the DC current Idc (the reference current value Iref11) that is output from the power supply device PS1, the charging voltage Vb of the storage battery unit 50 increases. Then, when the charging voltage Vb reaches the threshold voltage value Vth, the divided voltage Vdiv that is output from the voltage detection circuit 31 exceeds the threshold voltage value Vth. Therefore, the comparator 33 starts to output the H level voltage. Thus, because a current flows in the photodiode of the photocoupler 34, the phototransistor of the photocoupler 34 is turned ON. As a result, because a current also flows in the photodiode of the photocoupler 35, the phototransistor of the photocoupler 35 is also turned ON. Therefore, the operation instruction signal Ss2 is output to the power supply device PS2 located at the high potential side.

As a result, in the power supply device PS2, the control circuit 9 starts to perform switching control for the switch element of the switching circuit 5 (shifting to an operation state). In this case, the charging voltage Vb of the storage battery unit 50 does not reach a chargeable maximum voltage by the power supply devices PS1 and PS2 that are connected in series. In other words, the charging voltage Vb does not reach an added voltage value (Vref11+Vref21) that is obtained by adding each of the reference voltage values Vref11 and Vref21 of the power supply devices PS1 and PS2. Thus, the DC voltages Vdc that is output from the power supply device PS1 is less than the reference voltage value Vref11. Further, the DC voltages Vdc that is output from the power supply device PS2 is less than the reference voltage value Vref21. Each of the power supply devices PS1 and PS2 keeps performing the constant current control by regulating the current value of the present DC current Idc to smaller one of the reference current values Iref11 and Iref21 and by providing the regulated current (Iref11 or Iref21) to the storage battery unit 50 until each of the DC voltages Vdc reaches each of the reference voltage values Vref11 and Vref21 (until the charging voltage Vb of the storage battery unit 50 reaches the added voltage value (Vref11+Vref21) of each of the reference voltage values Vref11 and Vref21).

Thus, in the charging device CH2, when the charging voltage Vb of the storage battery unit 50 is lower than the threshold voltage Vth (at the time of a low voltage), first of all, only one power supply device PS (in the embodiment, the power supply device PS1) is shifted to an operating state and starts to perform a charging operation for the storage battery unit 50. After that, when the charging voltage Vb reaches the threshold voltage Vth, next power supply device PS (in the embodiment, the power supply device PS2) is shifted to the operating state and starts to perform the charging operation for the storage battery unit 50. As explained above, the plurality (in the embodiment, two) of power supply devices PS1 and PS2 that are connected in series are sequentially shifted to the operating state in a predetermined order and charge the storage battery unit 50.

As a result, in the charging device CH2, the storage battery unit 50 in which the charging voltage Vb is low can also be charged. Further, when the charging voltage Vb in which the power supply efficiency decreases is low, the charging device CH2 limits the number of the power supply devices PS that perform the charging operation to one, a minimum number. When the charging voltage Vb reaches the threshold voltage Vth, i.e., when the charging voltage Vb becomes high to some extent, the charging device CH2 shifts the next power supply device PS (in the embodiment, the power supply device PS2) to be in an operation state and charges the storage battery unit 50 to a higher charging voltage Vb by the plurality of power supply devices PS1 and PS2. Therefore, in the charging device CH2, the occurrence of a state, in which the plurality of power supply devices PS operate at the same time in a low power supply efficiency state (for instance, each of the power supply devices PS outputs the DC voltage Vdc with less than 20% of each reference voltage values Vref) is avoided. As a result, the deterioration of the power supply efficiency of the entire charging device CH2 is decreased.

When the starting switch 36 is operated to be in an ON state and when the charging voltage Vb of the storage battery unit 50 is higher than the threshold voltage Vth, the power supply control device CNT performs the above explained operation so as to output the operation instruction signal Ss1 to the power supply device PS1 that is the first to operate and the operation instruction signal Ss2 to the power supply device PS2 that is the second to operate at the same time. Therefore, the power supply devices PS1 and PS2 are immediately shifted to the operating state and perform the constant current control in which the current value of the DC current Idc is regulated to the reference current value Iref21 and is output to the storage battery unit 50. Thus, the power supply devices PS1 and PS2 start to charge the storage battery unit 50. Note that, in this case, the occurrence of a state, in which the plurality of power supply devices PS operate at the same time in the low power supply efficiency, is avoided. Therefore, the deterioration of the power supply efficiency is decreased.

Figure 6:
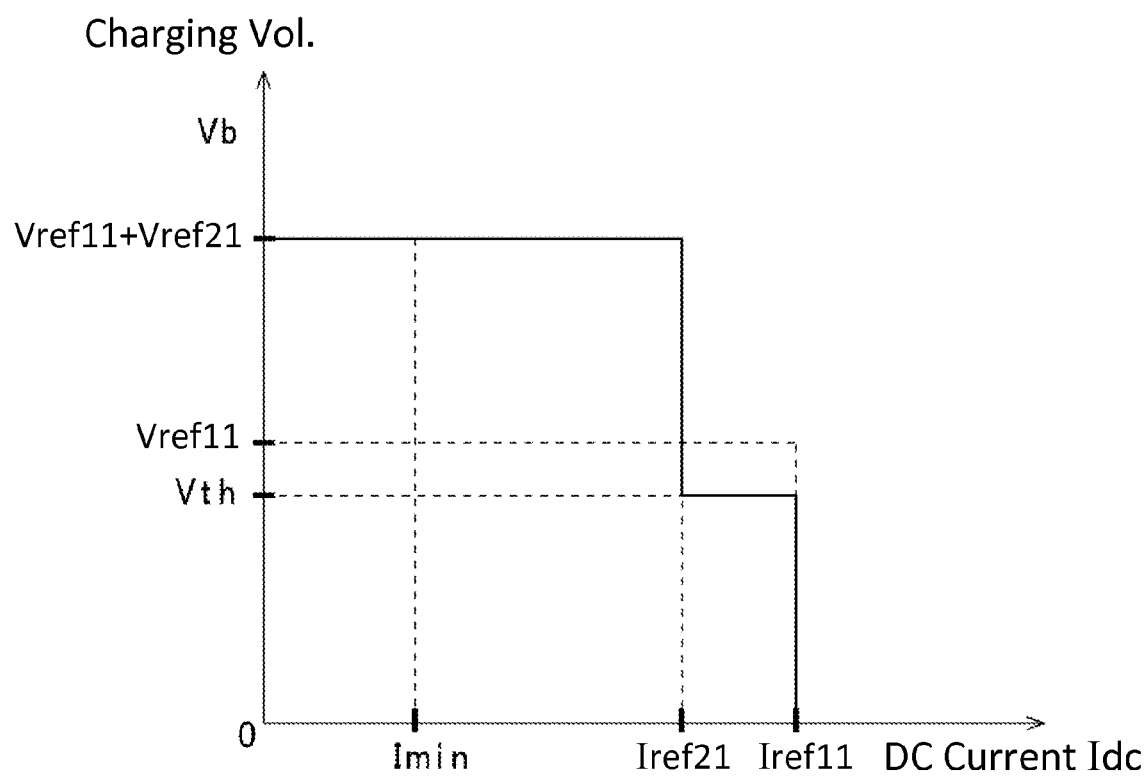
FIG. 6 is an output characteristic diagram that shows a characteristic of a charging voltage Vb and a DC current Idc of a charging device CH2 according to an embodiment of the present invention.

After that, when the DC voltage Vdc of each of the power supply devices PS1 and PS2 respectively reaches the reference values Vref11 and Vref21, i.e., when the voltage value of the charging voltage Vb of the storage battery unit 50 reaches the added voltage value (Vref11+Vref21) as shown in FIG. 6, the control circuit 9 of the power supply device PS1 performs the constant voltage control by which the DC current Idc is output while the voltage value of the present DC voltage Vdc is maintained as the reference voltage value Vref11. Further, the control circuit 9 of the power supply device PS2 also performs the constant voltage control by which the DC current Idc is output while the voltage value of the present DC voltage Vdc is maintained as the reference voltage value Vref21. In this case, the current value of the DC current Idc that is output to the storage battery unit 50 from the power supply devices PS1 and PS2 gradually decreases from the reference current value Iref21. When the current value of the present DC current Idc reaches the minimum (lower limit) current value Imin (Imin<Iref21), each of the control circuits 9 stops the operation for generating the DC voltage Vdc by controlling the switching element of each switching circuit 5 to be in an OFF state, i.e., the DC voltage Vdc becomes zero volts. As a result, the charging for the storage battery unit 50 by the charging device CH2 is completed.

Thus, in the charging device CH2, the bypass rectifying device 110 is provided to each of the power supply devices PS except the first one ((n−1) power supply devices PS). The one power supply device PS (in the embodiment, the power supply device PS1) is shifted to operate first by the power supply control device CNT. The one power supply device PS that is the first to operate always operates while the charging device CH2 performs the charging operation to the storage battery unit 50. The bypass rectifying device 110 is connected between the negative output terminal 130 and the positive output terminal (either of the positive output terminal 120 and the serial connection terminal 14 as another output terminal) in advance. Further, a forward direction of the bypass rectifying device 110 faces toward the positive output terminal. Therefore, the bypass rectifying device 110 is not provided to the one power supply device PS (PS1). That is, the bypass rectifying device 110 is provided to at least the other power supply devices PS ((n−1) power supply devices).

Therefore, according to the charging device CH2 as explained above, the "n" power supply devices PS that are connected in series can be sequentially shifted to the operating state in a predetermined order (in the embodiment, the two power supply devices PS1 and PS2 in this order). Therefore, the storage battery unit 50 in which the charging voltage Vb is low can also be charged. Further, as explained above, when the charging voltage Vb in which the power supply efficiency decreases is low, the charging device CH2 limits the number of the power supply devices PS that perform the charging operation to one, a minimum number. Further, when the charging voltage Vb reaches the threshold voltage Vth, i.e., when the charging voltage Vb becomes high to some extent, the charging device CH2 can shift the next power supply device PS (in the embodiment, the power supply device PS2) to the operating state. Therefore, the plurality of power supply devices PS1 and PS2 can charge the storage battery unit 5 to a higher charging voltage Vb. At the same time, the occurrence of a state, in which the plurality of power supply devices PS operate at the same time in the low power supply efficiency state, can be avoided. As a result, deterioration of the power supply efficiency of the entire charging device CH2 can be decreased.

Further, according the charging device CH2, the power supply control device CNT compares the charging voltage Vd with the threshold voltage Vth and shifts the next power supply device PS2 to the operating state when the charging voltage Vd reaches the threshold voltage Vth. Specifically, the threshold voltage Vth is defined in advance to be either of (i) the total voltage value (the reference voltage value Vref11) of the maximum output voltage value (the reference voltage value) of the power supply device PS1, which is in the operating state by corresponding to the number (in the embodiment, one) of the power supply devices PS1 that are in the operating state, and (ii) the neighboring voltage value of the total voltage value. As a result, the voltage value of the DC voltage Vdc of each of the power supply devices PS1 and PS2 can be set as high as possible when the power supply device PS2 is shifted to the operating state. Therefore, the occurrence of a state, in which the power supply devices PS1 and PS2 operate at the same time in the low power supply efficiency state, can certainly be avoided. The deterioration of the power supply efficiency of the entire charging device CH2 can be certainly decreased.

The charging device CH2 can start to operate the plurality of power supply devices in descending order of the reference current value (the maximum output voltage value) Iref that is defined by an overcurrent protection characteristic. In the embodiment, the charging device CH2 can start to operate the power supply device PS1 and the power supply device Ps2 in this order. Therefore, when the charging voltage Vb of the storage battery unit 50 is low, a constant current charging can be performed with a large reference current value Iref11. As a result, the storage battery unit 50 can be charged in a short period of time while the deterioration of the power supply efficiency of the entire charging device CH2 is decreased.

In the power supply device PS, the serial connection terminal 14 is directly connected (direct connection) to the positive output end 8a of the smoothing circuit 8 without interposing a rectifying device. Therefore, a voltage drop that is caused by existence of the reverse flow prevention rectifying device 100 can be limited to be the single forward voltage Vf corresponding to the reverse flow prevention rectifying device 100 because the plurality of power supply devices PS (PA1 and PS2) are connected in series by using the serial connection terminal 14.

Further, according to the power supply device PS, at least one of rectifying device of the reverse flow prevention rectifying device 100 and the bypass rectifying device 110 (the reverse flow prevention rectifying device 100 in the embodiment) is electrically isolated by the bus bar 15 and attached to the bus bar 15 under a good condition of a thermal conductivity. Therefore, heat that is generated by at least one rectifying device can efficiently be radiated.

Third Embodiment

In the charging device CH2 explained above, the two power supply devices PS1 and PS2 that are connected in series are explained as an example of connecting the "n" power supply devices PS in series. The "n" (n corresponds to over 2) power supply devices PS1-PSn that are connected to each other in series and a charging device CHa that is provide at a power supply control device CNTa will be explained with reference to FIG. 7. Each of the power supply devices PS of the charging device CHa is different with respect to a constant current voltage drooping type overcurrent protection characteristics, however, a basic configuration of the power supply devices PS is the same as the configurations of the power supply devices PS1 and PS2 explained above. Therefore, an illustration for a part of the component is omitted and redundant explanations with respect to the same configurations as the power supply devices PS are omitted but the same reference numerals are used for labeling.

The power supply control device CNTa is provided with multiple sets ((n−1) sets) of components (a reference power supply 32, a comparator 33, and photocouplers 34 and 35), which are disclosed in the above embodiment of the basic configurations of the power supply control device CNT, so as to generate operation instruction signals Ss2-Ssn. In this respect, the power supply control device CNTa is different from the power supply control device CNT, however, other components (a starting switch 36 and resistors 37 and 38) of the power supply control devices CNTa are identical. Therefore, redundant explanations with respect to the same configurations between the power supply control device CNTa and a power supply control device CNT are omitted but the same reference numerals are used for labeling.

Figure 7:
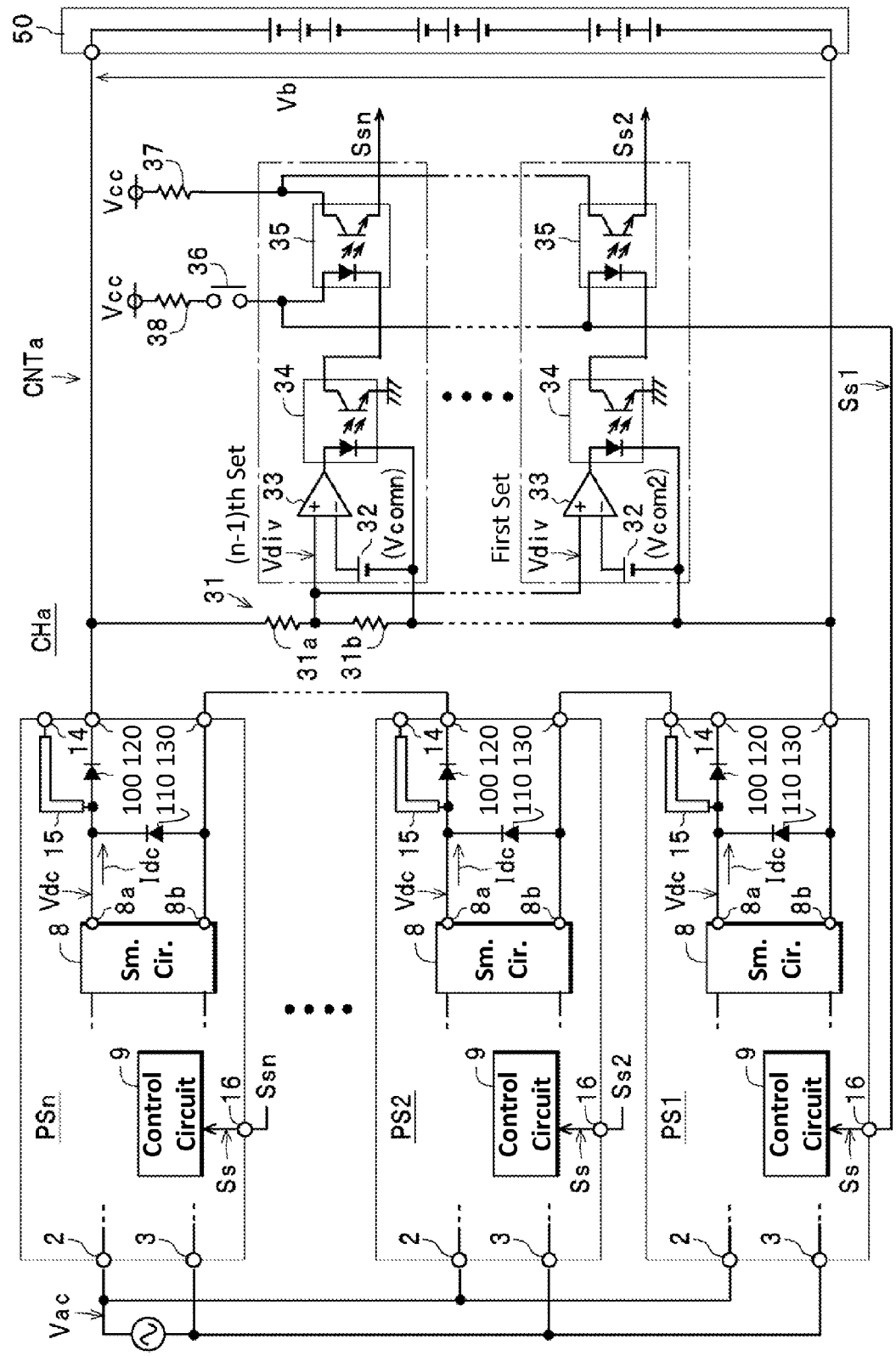
FIG. 7 is a circuit diagram that shows a configuration of a charging device CHa that is provided with "n" power supply devices PS1-PSn according to an embodiment of the present invention.

In the charging device CHa, as shown in FIG. 7, "n" power supply devices PS1-PSn are connected to each other in series by connecting a negative output terminal 130 of a power supply device PS located at a high potential side and a positive output terminal (in the embodiment, a serial connection terminal 14) of a power supply device PS located at a low potential side by a connecting line in the same manner as the charging device CH2. Further, a positive output terminal 120 of a power supply device PS (in the embodiment, a power supply device PSn) that is located at a highest potential side is connected to a positive electrode of a storage battery unit 50 by the connecting line. A negative output terminal 130 of a power supply device PS (in the embodiment, a power supply device PS1) that is located at a lowest potential side is connected to a negative electrode of the storage battery unit 50 by the connecting line. Therefore, the DC voltages Vdc of each of the power supply devices PS1-PSn are added and are output to the storage battery unit 50 from between the positive output terminal 120 of the power supply device PSn and the negative output terminal 130 of the power supply device PS1.

For instance, in a case in which a forward voltage Vf of a reverse flow prevention rectifying device 100 of the power supply device PSn that is located at the highest potential side can be ignored, when each of the reference voltage values of the power supply devices PS1, PS2, . . . , PSn corresponds to Vref1, Vref2, . . . , Vrefn, the charging device CHa is configured to be able to change the storage battery unit 50 to the following voltage value. The charging voltage Vb of storage battery unit 50 can be a total voltage value (Vref1+Vref2+ . . . +Vrefn) that is obtained by adding each reference voltage value, Vref1, Vref2, . . . , Vrefn of the power supply device, PS1, PS2, . . . , Psn.

As shown in FIG. 7, the power supply control device CNTa is configured with a plurality (n−1) of component sets including a reference power supply 32, a comparator 33 and photocouplers 34, 35 that are surrounded by a dashed line. The power supply control device CNTa is also configured with a starting switch 36 and resistors 37 and 38. Anode terminals of photodiodes of each set of the photocouplers 35 are commonly connected to the starting switch 36. Further, collector terminals of the phototransistors of each set of the photocouplers 35 are commonly connected to the resistor 37.

In the same manner as the power supply control device CNT in the charging device CH2 explained above, when the charging voltage Vb reaches a predetermined threshold voltage Vref11, a divided voltage Vdiv exceeds a comparison voltage value Vcom2 that is generated by a first set of the reference power supply 32. As a result, the comparator 33 outputs an H level voltage. Specifically, the threshold voltage Vth1 corresponds to the reference voltage value Vref11 of the power supply device PS1 or the neighboring voltage (for instance, the voltage value of about 80% of the reference voltage value Vref11 as shown in FIG. 6). As a result, a voltage dividing rate of resistors 31a and 31b and the comparison voltage Vcom2 are defined in advance so as to output an operation instruction signal Ss2 to the power supply device PS2 from the phototransistor of the photocoupler 35.

Though it is not shown, when the charging voltage Vb reaches a predetermined threshold voltage Vref21, the divided voltage Vdiv exceeds a comparison voltage value Vcom3 that is generated by a second set of the reference power supply 32. As a result, the comparator 33 outputs an H level voltage. Specifically, the threshold voltage Vth2 corresponds to a total voltage value that is obtained by adding each of the reference voltage values Vref11, Vref21 of the power supply devices PS1, PS2 or the neighboring voltage (for instance, the voltage value of about 80% of the total reference voltage value (Vref11+Vref21). As a result, the comparison voltage Vcom3 is defined in advance so as to output an operation instruction signal Ss3 to the power supply device PS3 from the phototransistor of the photocoupler 35.

In the same manner as the previous explanations, when the charging voltage Vb reaches a predetermined threshold voltage Vrefn1, the divided voltage Vdiv exceeds a comparison voltage value Vcomn that is generated by a (n−1)th set of the reference power supply 32. As a result, the comparator 33 outputs an H level voltage. Specifically, the threshold voltage Vthn corresponds to a total voltage value that is obtained by adding each of the reference voltage values Vref11, Vref21, . . . , Vref(n−1)1 of the power supply devices PS1, PS2, . . . , PSn−1 or the neighboring voltage (for instance, the voltage value of about 80% of the total reference voltage value (Vref11+Vref21+ . . . +Vref(n−1)1). As a result, the comparison voltage Vcomn is defined in advance so as to output an operation instruction signal Ssn to the power supply device PSn from the phototransistor of the photocoupler 35.

That is, the power supply control device CNTa compares the threshold voltage Vth that is defined in advance corresponding to the number of the power supply devices PS that are in the operating state out of the "n" power supply devices PS with the charging voltage Vb of the storage battery unit 50. Specifically, the threshold voltage Vth is defined in advance by either of the total voltage value of the reference voltage values Vref (the maximum output voltage value) of the power supply devices PS that are in the operating state or the neighboring voltage value of the total voltage value. When the charging voltage Vb reaches the threshold voltage Vth, the next power supply device PS is shifted to an operating state.

Therefore, the charging device CHa can sequentially shift the "n" power supply devices PS that are connected in series in a predetermined order (in the embodiment, in order of the power supply device PS1, the power supply device PS2, . . . , the power supply device PSn). As a result, the storage battery unit 50 in which the charging voltage Vb is low can also be charged. The occurrence of a state, in which the plurality of power supply devices PS operate at the same time in the low power supply efficiency state, can be avoided. As a result, the deterioration of the power supply efficiency of an entire charging device CHa can be decreased.

Further, in the charging device Cha, the power supply control device CNTa compares the charging voltage Vd with the threshold voltage Vth and shifts the next power supply device PS to the operating state when the charging voltage Vd reaches the threshold voltage Vth. Specifically, the threshold voltage Vth is defined in advance to be either of (i) the total voltage value (the reference voltage value) of the maximum output voltage values (the reference voltage value) of each of the power supply devices PS, which are in the operating state by corresponding to the number of the power supply devices PS that are in the operating state, and (ii) the neighboring voltage value of the total voltage value. As a result, the voltage value of the DC voltage Vdc of each of the power supply devices PS can be set as high as possible when the new power supply device PS is shifted to the operating state. Therefore, the occurrence of a state, in which the power supply devices PS operate at the same time in the low power supply efficiency state, can certainly be avoided. The deterioration of the power supply efficiency of the entire charging device CHa can be certainly decreased.

In the above charging devices CH2, Cha, the "predetermined order" for shifting each of the power supply devices PS connected in series to the operating state adopt the configuration in which it is preferred to be sequentially shifted to the operating state in descending order of the reference current value (the maximum output current value) Iref. However, when each of the power supply devices PS has the same specification with respect to the reference current value Vref, any power supply device PS can be shifted to the operating state regardless of the order of the serial connection.

In the charging devices CH2 and CHa explained above, each of the power supply devices PS has the serial connection terminal 14. However, a configuration in which the serial connection terminal 14 is not used can be adopted. In this configuration, the "n" power supply devices PS are connected in series by connecting the negative output terminal 130 of the power supply device PS located at the high potential side and the positive output terminal 120 of the power supply device PS located at the low potential side.

The charging device being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. A charging device, comprising:
a power supply device having a constant current voltage drooping overcurrent protection characteristic, the power supply device including a first positive output terminal and a first negative output terminal, and outputting a first direct current voltage between the first positive output terminal and the first negative output terminal; and
a DC-DC converter that is connected to the power supply device in series, the DC-DC converter:
having the constant current voltage drooping overcurrent protection characteristic;
including a positive input terminal, a negative input terminal, a second positive output terminal and a second negative output terminal; and
outputting a second direct current voltage between the second positive output terminal and the second negative output terminal, wherein
the first positive output terminal is connected to the positive input terminal and the first negative output terminal is connected to the negative input terminal, and the DC-DC converter outputs the second direct current voltage by receiving the first direct current voltage as an operation voltage,
the power supply device is connected to the DC-DC converter in series by connecting the first positive output terminal to the second negative output terminal, and a charging target is connectable between the first negative output terminal and the second positive output terminal,
the power supply device has a first constant current value when the power supply device is in a voltage drooping state, the DC-DC converter has a second constant current value when the DC-DC converter is in the voltage drooping state, and the second constant current value is lower than the first constant current value, and
the DC-DC converter is shifted to an operation state to supply a charging current of the second constant current value to the charging target when a voltage value of the first direct current voltage reaches one of a maximum output voltage value and an approximate value of the maximum voltage value.

2. A charging device, comprising:
a plurality of power supply devices that are connected in series, each of the plurality of power supply devices having a positive output terminal and a negative output terminal;
a power source control device that sequentially shifts the plurality of power supply devices to an operation state in a predetermined order; and a rectifying device that is connected between the positive output terminal and the negative output terminal of each of the plurality of power supply devices except a first power supply device of the plurality of power supply devices that is initially shifted to the operation state, and a forward direction of the rectifying device faces toward the positive outlet terminal, wherein the positive output terminal of one of the first power supply device and a second power supply device of the plurality of power supply devices located at a low potential side is connected to the negative output terminal of one of the second power supply device and a third power supply device of the plurality of power supply devices located at a high potential side so as to serially connect the plurality of power supply devices, and a battery is connected between the positive output terminal of one of the second power supply device and the third power supply device of the plurality of power supply devices located at a highest potential side and the negative output terminal of the first power supply device of the plurality of power supply devices located at a lowest potential side.

3. The charging device according to claim 2, wherein the power source control device compares a charging voltage of the battery with a predetermined threshold voltage, and the power source control device shifts a next power supply device to the operation state in the predetermined order when the charging voltage reaches the threshold voltage.

4. The charging device according to claim 3, wherein the threshold voltage is a total maximum output voltage value that is obtained by adding each maximum output voltage value of each of the plurality of power supply devices that are shifted to the operation state.

5. The charging device according to claim 3, wherein the threshold voltage is an approximate value of a total maximum output voltage value that is obtained by adding each maximum output voltage value of each of the plurality of power supply devices that are shifted to the operation state.

6. The charging device according to claim 3, wherein the power source control device sequentially shifts the plurality of power supply devices to the operation state in an order of descending maximum output current values.

7. The charging device according to claim 2, wherein the power source control device sequentially shifts the plurality of power supply devices to the operation state in an order of descending maximum output current values.

* * * * *